(12) United States Patent
Li et al.

(10) Patent No.: US 7,504,991 B2
(45) Date of Patent: Mar. 17, 2009

(54) DISTANCE MEASURING SYSTEM

(75) Inventors: Huan-Bang Li, Koganei (JP); Kenichi Takizawa, Koganei (JP)

(73) Assignee: National Institute of Information and Communications Technology Incorporated Administrative Agency, Tokyo (JP)

( * ) Notice: Subject to any disclaimer, the term of this patent is extended or adjusted under 35 U.S.C. 154(b) by 188 days.

(21) Appl. No.: 11/370,066

(22) Filed: Mar. 8, 2006

(65) Prior Publication Data
US 2006/0214841 A1 Sep. 28, 2006

(30) Foreign Application Priority Data
Mar. 11, 2005 (JP) ............................. 2005-068801

(51) Int. Cl.
*G01S 13/08* (2006.01)
*G01S 13/10* (2006.01)
(52) U.S. Cl. ..................... 342/118; 342/125; 342/134
(58) Field of Classification Search ............. 342/125, 342/118–146, 42, 47, 73, 85, 88, 458, 70–72, 342/94, 13–20; 367/47, 99; 702/143
See application file for complete search history.

(56) References Cited

U.S. PATENT DOCUMENTS

| | | | | |
|---|---|---|---|---|
| 5,091,917 A | * | 2/1992 | Udd et al. .................... 375/224 |
| 5,396,250 A | * | 3/1995 | Tsui et al. ..................... 342/13 |
| 5,912,639 A | * | 6/1999 | Beckner ....................... 342/22 |
| 6,111,536 A | * | 8/2000 | Richards et al. ............. 342/125 |
| 7,012,560 B2 | * | 3/2006 | Braeuchle et al. ............. 342/70 |
| 7,110,779 B2 | * | 9/2006 | Billhartz et al. .......... 455/456.2 |
| 7,227,493 B2 | * | 6/2007 | Oswald et al. ................ 342/70 |
| 2002/0171586 A1 | * | 11/2002 | Martorana et al. .......... 342/458 |
| 2005/0134440 A1 | * | 6/2005 | Breed ......................... 340/435 |

OTHER PUBLICATIONS

J.Lampe, R.Hach, L.Menzer; Working Group For Wireless Personal Area Networks (WPANs), Jan. 2005, IEEE P802.15.

* cited by examiner

*Primary Examiner*—Thomas H Tarcza
*Assistant Examiner*—Cassi Galt
(74) *Attorney, Agent, or Firm*—Bacon & Thomas, PLLC

(57) ABSTRACT

Disclosed is a distance measuring system comprising a transmitter that sequentially generates pulse sequences each having a plurality of pulse signals of equal amplitudes arranged at equi-time intervals, and transmits the generated pulse sequence as a radio wave; and a receiver that receives the pulse sequence transmitted from the transmitter as a radio wave, and has a distance calculator that acquires propagation times of the pulse signals in the received pulse sequence, and calculates a distance from the transmitter by giving different weightings to the pulse signals for the propagation times acquired for the respective pulse signals. As the amplitudes of the pulse signals in the received pulse sequence become larger, the weightings are made larger.

4 Claims, 11 Drawing Sheets

ACTUAL RECEPTION TIME

FIRST ESTIMATION

SECOND ESTIMATION

US 7,504,991 B2

DISTANCE MEASURING SYSTEM

BACKGROUND OF THE INVENTION

1. Field of the Invention

The present invention relates to a distance measuring system that measures a distance based on the propagation time of a pulse signal from a transmitter to a receiver.

2. Description of the Related Art

Conventionally, there has been proposed a distance measuring system which uses radio waves as a so-called distance measuring method to measure a distance between two different points.

To measure a distance l from a point F to a point G, for example, a transmitter 61 and a receiver 62 as radio stations are respectively placed at the point F and the point G in the distance measuring system as shown in FIG. 9. The transmitter 61 transmits a radio wave comprised of pulse signals, which are received by the receiver 62. A propagation time Td for the pulse signal transmitted from the transmitter 61 to be received by the receiver 62 is measured. The distance l can be calculated by multiplying the measured propagation time Td by a propagation speed Vc of the radio wave. As the propagation speed Vc of the radio wave is constant, the distance l can be measured accurately by measuring the propagation time Td alone.

Proposed methods of measuring the propagation time Td include a method of employing a spread spectrum technology which measures a distance between transceivers at the phase timing of a spread code in transmission and reception in addition to a method of measuring the time at which the pulse signal zero-crosses, and a method of measuring the propagation time Td by identifying a phase difference of the pulse signal.

FIG. 10 shows a conventional system configuration using the spread spectrum technology. The system measures a distance d between a transceiver 71 and a transceiver 72 located at two different points. The transceiver 71 includes a spread-signal generator 81 which generates a baseband spread code, a transmitting unit 82 connected to the spread-signal generator 81, an antenna 83 connected to the transmitting unit 82, an antenna 84 for receiving a radio wave from the transceiver 72, a receiving unit 85 connected to the antenna 84, a correlation calculator 86 connected to the receiving unit 85, a correlation-position determining unit 87 connected to the correlation calculator 86, and a distance measuring unit 88 connected to the spread-signal generator 81 and the correlation-position determining unit 87. The distance measuring unit 88 finally measures the distance d.

The transceiver 72 includes an antenna 91 for receiving a radio wave sent from the antenna 83 of the transceiver 71, a receiving unit 92 connected to the antenna 91, a frequency converter 93 connected to the receiving unit 92, a transmitting unit 94 connected to the frequency converter 93, and an antenna 95, connected to the transmitting unit 94, for transmitting a radio wave.

The spread-signal generator 81 in the transceiver 71 generates a baseband spread code and a phase timing signal for the spread code. The transmitting unit 82 converts the generated spread code to a high-frequency signal with a center frequency f1, and transmits the high-frequency signal to the transceiver 72 via the antenna 83.

In the transceiver 72, the receiving unit 92 amplifies the high-frequency spread code received via the antenna 91, the frequency converter 93 converts the frequency of the amplified spread code to a center frequency f2, and the resultant code is retransmitted to the transceiver 71 via the transmitting unit 94 and the antenna 95. The transceiver 71 receives the retransmitted spread code via the antenna 84 and the receiving unit 85, and converts the high-frequency spread code to a baseband spread code by orthogonal detection. The correlation calculator 86 performs autocorrelation on the spread code, and the correlation-position determining unit 87 detects the phase timing of the received spread code based on an autocorrelation peak position. The distance measuring unit 88 detects a difference T1 between the phase timing of the transmitted spread code and the phase timing of the received spread code, and calculates the distance d between the transceivers 71 and 72.

Non-patent Literature 1

J. Lampe, R. Hach, L. Menzer IEEE-15-05-0002-00-004a January 2005

Recently has been proposed a distance measuring system that generates a pulse sequence having a plurality of pulse signals of equal amplitudes arranged at equi-time intervals in a transmitter, transmits a radio wave comprised of the pulse sequence to a receiver from the transmitter, and calculates, in the receiver, the distance from the propagation time of each of the pulse signals in the pulse sequence, as shown in FIG. 11. (See, for example, Non-patent literature 1.)

The distance measuring system is similar to the aforementioned distance measuring system in that the propagation time Td is acquired based on the time at which each of the pulse signals in the pulse sequence zero-crosses. For instance, a pulse signal $J_1$ generated at time $t_{51}$ in the transmitter in the example shown in FIG. 11 is received as a pulse signal $J_1'$ by the receiver at time $t_{61}$. The time interval from time $t_{51}$ to time $t_{61}$ is equivalent to a propagation time Td1. In the distance measuring system, not only the propagation time Td of a single pulse signal, but also the propagation times Td of the pulse signals $J_1'$, $J_2'$, $J_3'$, $J_i'$, $J_{i+1}'$, . . . received by the receiver are respectively acquired with respect to the pulse signals $J_1$, $J_2$, $J_3$, $J_i$, $J_{i+1}$, . . . , which constitute the pulse sequence.

As a result, a propagation time Td2 calculated for the pulse signal $J_2'$ with respect to the pulse signal $J_2$, a propagation time Td3 calculated for the pulse signal $J_3'$ with respect to the pulse signal $J_3$, a propagation time Tdi calculated for the pulse signal $J_i'$ with respect to the pulse signal $J_i$, and so forth are sequentially acquired. The average value of the propagation times Td1, Td2, Td3, . . . , Tdi is calculated, and the distance from the transmitter to the receiver is acquired based on the average propagation time. The use of the average propagation time for the pulse signals in calculating the distance can suppress an error in measuring a distance of 30 m to about 81.7 cm.

Instead of acquiring the propagation time Td, the average propagation time may be acquired based on time differences between the pulse signals $J_1'$, $J_2'$, $J_3'$, $J_i'$, $J_{i+}'$, . . . in the pulse sequence received by the receiver. Given that the pulse signals are formed at equi-time intervals T therebetween on the transmitter side as shown in FIG. 11, the time differences between the pulse signals $J_1'$, $J_2'$, $J_3'$, $J_i'$, $J_{i+1}'$, . . . are expressed by T+d where d is an error difference of the propagation time T based on the influence of another radio wave, noise or the like over the time to reach the receiver from the transmitter.

For example, the time difference between the pulse signals $J_1'$ and $J_2'$ is expressed by $T+d_1$, the time difference between the pulse signals $J_2'$ and $J_3'$ is expressed by $T+d_2$, and the time difference between the pulse signals $J_i'$ and $J_{i+1}'$ is expressed by $T+d_i$ ($|d_i|>0$). Acquisition of the average value of $d_1$, $d_2$, . . . , $d_i$ makes it possible to calculate the average propagation time.

Instead of acquiring the average propagation time, time differences $T+d_1, T+d_2, \ldots, T+d_i$ between the pulse signals $J_1', J_2', J_3', J_i', J_{i+1}', \ldots$ in the pulse sequence received by the receiver may be calculated in the aforementioned manner, a pulse signal J' which minimizes d in the calculated time differences T+d is specified, and the propagation time of the specified pulse signal J' may be acquired. It is still possible to reduce an error in the distance to be actually measured in this case.

Even when the distance is calculated based on the average value of the propagation times of pulse signals in a pulse sequence according to the conventional method, however, an error of about 80 cm is included in a distance of 30 m after all. This does not make it possible to provide a system configuration adaptable to a location where a high-precision distance measurement with a smaller error is desired, so that the versatility of the overall system cannot be enhanced, disadvantageously.

SUMMARY OF THE INVENTION

Accordingly, the present invention has been made in consideration of the problems, and it is an object of the invention to provide a distance measuring system which calculates a distance from propagation times of pulse signals in a pulse sequence and achieves high-precision distance measuring with a smaller error.

The present inventor has devised a distance measuring system capable of achieving high-precision distance measuring in view of the fact that the level of the amplitude of each pulse signal in a pulse sequence to be transmitted from a transmitter and received by a receiver has not been used yet as information, and the time differences between the pulse signals in the pulse sequence received by the receiver.

More specifically, to achieve the object, a distance measuring system according to one aspect of the invention comprises a transmitter including a pulse sequence generator that sequentially generates pulse sequences each having a plurality of pulse signals of equal amplitudes arranged at equi-time intervals, and a transmitting unit that transmits the pulse sequence generated by the pulse sequence generator as a radio wave; and a receiver including a receiving unit that receives the pulse sequence transmitted from the transmitter as a radio wave, and a distance calculating unit that acquires propagation times of the pulse signals in the pulse sequence received by the receiving unit to reach the receiving unit from the transmitting unit, and calculates a distance from the transmitter by giving different weightings to the pulse signals for the propagation times acquired for the respective pulse signals, whereby as the amplitudes of the pulse signals in the received pulse sequence become larger, the weightings are made larger.

To achieve the object, a distance measuring system according to another aspect of the invention comprises a transmitter including a pulse sequence generator that sequentially generates pulse sequences each having a plurality of pulse signals of equal amplitudes arranged at equi-time intervals, and a transmitting unit that transmits the pulse sequence generated by the pulse sequence generator as a radio wave; and a receiver including a receiving unit that receives the pulse sequence transmitted from the transmitter as a radio wave, and a distance calculating unit that acquires an average value of the amplitudes of the pulse signals in the pulse sequence received by the receiving unit, sequentially calculates an absolute value of differences between the acquired average value of the amplitudes and the amplitudes of the pulse signals, specifies a pulse signal whose amplitude minimizes the calculated absolute value of differences, and calculates a distance from the transmitter based on a propagation time for the specified pulse signal to reach the receiving unit from the transmitting unit.

To achieve the object, a distance measuring system according to a further aspect of the invention comprises a transmitter including a pulse sequence generator that sequentially generates pulse sequences each having a plurality of pulse signals of equal amplitudes arranged at equi-time intervals, and a transmitting unit that transmits the pulse sequence generated by the pulse sequence generator as a radio wave; and a receiver including a receiving unit that receives the pulse sequence transmitted from the transmitter as a radio wave, and a distance calculating unit that acquires an average value of absolute values of time differences among the pulse signals in the pulse sequence received by the receiving unit, performs a first estimation to estimate a time of reception of a pulse signal based on the acquired average value and a time of reception of another adjoining pulse signal, and calculates a distance from the transmitter based on the time of reception of the pulse signal estimated in the first estimation and a propagation time for that pulse signal to reach the receiving unit from the transmitting unit.

To achieve the object, a distance measuring system according to a still further aspect of the invention comprises a transmitter including a pulse sequence generator that sequentially generates pulse sequences each having a plurality of pulse signals of equal amplitudes arranged at equi-time intervals, and a transmitting unit that transmits the pulse sequence generated by the pulse sequence generator as a radio wave; and a receiver including a receiving unit that receives the pulse sequence transmitted from the transmitter as a radio wave, and a distance calculating unit that acquires propagation times of the pulse signals in the pulse sequence received by the receiving unit to reach the receiving unit from the transmitting unit, and calculates a distance from the transmitter based on a center value of the acquired propagation time of each pulse signal.

To achieve the object, a distance measuring system according to a yet still further aspect of the invention comprises a transmitter/receiver including a pulse sequence generator that sequentially generates pulse sequences each having a plurality of pulse signals of equal amplitudes arranged at equi-time intervals, and a transmitting/receiving unit that transmits at least the pulse sequence generated by the pulse sequence generator and can receive the pulse sequence; and a communication apparatus that receives the pulse sequence transmitted from the transmitter/receiver as a radio wave, and transmits the pulse sequence to the transmitter/receiver, wherein the transmitter/receiver receives the pulse sequence transmitted from the communication apparatus via the transmitting/receiving unit, acquires propagation times of the pulse signals in the pulse sequence received by the transmitting/receiving unit since transmission thereof from the transmitting/receiving unit, calculates a distance from the communication apparatus by giving different weightings to the pulse signals for the propagation times acquired for the respective pulse signals, and increases the weightings as the amplitudes of the pulse signals in the received pulse sequence become larger.

To achieve the object, a distance measuring system according to a yet still further aspect of the invention comprises a transmitter/receiver including a pulse sequence generator that sequentially generates pulse sequences each having a plurality of pulse signals of equal amplitudes arranged at equi-time intervals, and a transmitting/receiving unit that transmits at least the pulse sequence generated by the pulse sequence generator and can receive the pulse sequence; and a communication apparatus that receives the pulse sequence transmitted from the transmitter/receiver as a radio wave, and transmits the pulse sequence to the transmitter/receiver, wherein the transmitter/receiver receives the pulse sequence transmitted from the communication apparatus via the transmitting/receiving unit, acquires an average value of the amplitudes of the pulse signals in the pulse sequence received by the transmitting/receiving unit, sequentially calculates an absolute value of differences between the acquired average value of the amplitudes and the amplitudes of the pulse signals, specifies a pulse signal whose amplitude minimizes the calculated absolute value of differences, and calculates a distance from the communication apparatus based on a propagation time from transmission of the specified pulse signal from the transmitting/receiving unit to reception of the specified pulse signal thereby.

To achieve the object, a distance measuring system according to a yet still further aspect of the invention comprises a transmitter/receiver including a pulse sequence generator that sequentially generates pulse sequences each having a plurality of pulse signals of equal amplitudes arranged at equi-time intervals, and a transmitting/receiving unit that transmits at least the pulse sequence generated by the pulse sequence generator and can receive the pulse sequence; and a communication apparatus that receives the pulse sequence transmitted from the transmitter/receiver as a radio wave, and transmits the pulse sequence to the transmitter/receiver, wherein the transmitter/receiver receives the pulse sequence transmitted from the communication apparatus via the transmitting/receiving unit, acquires an average value of absolute values of time differences among the pulse signals in the pulse sequence received by the transmitting/receiving unit, performs a first estimation to estimate a time of reception of a pulse signal based on the acquired average value and a time of reception of another adjoining pulse signal, and calculates a distance from the communication apparatus based on the time of reception of the pulse signal estimated in the first estimation and a propagation time of the pulse signal from the transmitting unit to the receiving unit.

To achieve the object, a distance measuring system according to a yet still further aspect of the invention comprises a transmitter/receiver including a pulse sequence generator that sequentially generates pulse sequences each having a plurality of pulse signals of equal amplitudes arranged at equi-time intervals, and a transmitting/receiving unit that transmits at least the pulse sequence generated by the pulse sequence generator and can receive the pulse sequence; and a communication apparatus that receives the pulse sequence transmitted from the transmitter/receiver as a radio wave, and transmits the pulse sequence to the transmitter/receiver, wherein the transmitter/receiver receives the pulse sequence transmitted from the communication apparatus via the transmitting/receiving unit, acquires propagation times of the pulse signals in the pulse sequence received by the transmitting/receiving unit since transmission thereof from the transmitting/receiving unit, and calculates a distance from the communication apparatus based on a center value of the acquired propagation time of each pulse signal.

According to the distance measuring system of the invention, at the time of calculating a distance L from the transmitter by giving different weightings to the pulse signals for the propagation times acquired for the respective pulse signals, as the amplitudes of the pulse signals in the received pulse sequence become larger, the weightings are made larger. Accordingly, the distance L to be acquired is calculated in such a way that the propagation time of a pulse signal with a larger amplitude is reflected greater on the distance L, and the propagation time of a pulse signal with a smaller amplitude is less reflected on the distance L. This can reduce an error in measuring the distance.

The distance measuring system of the invention acquires an average value of the amplitudes of the pulse signals in the pulse sequence received by the receiver, sequentially calculates an absolute value of differences between the acquired average value of the amplitudes and the amplitudes of the pulse signals, specifies a pulse signal whose amplitude minimizes the calculated absolute value of differences, and calculates a distance from the transmitter based on a propagation time for the specified pulse signal to reach the receiving unit from the transmitting unit. This can reduce an error in measuring the distance.

The distance measuring system of the invention acquires an average value of absolute values of time differences among the pulse signals in the pulse sequence, performs a first estimation to estimate a time of reception of a pulse signal based on the acquired average value and a time of reception of another adjoining pulse signal, further acquires an average value of absolute values of time differences among the pulse signals based on the time of reception of the pulse signal estimated in the first estimation, performs a second estimation to estimate a time of reception of a pulse signal based on the acquired average value and an estimated time of reception of another adjoining pulse signal, and calculates a distance from the transmitter based on the time of reception of the pulse signal estimated in the second estimation and a propagation time for that pulse signal to reach the receiving unit from the transmitting unit.

The distance measuring system of the invention sequentially generates pulse sequences each having a plurality of pulse signals of equal amplitudes arranged at equi-time intervals, transmits the generated pulse sequence as a radio wave, receives the pulse sequence transmitted from the transmitter as a radio wave on the receiver side, acquires propagation times of the pulse signals in the received pulse sequence, and calculates a distance from the transmitter based on a center value of the acquired propagation time of each pulse signal. This can reduce an error in measuring the distance.

DETAILED DESCRIPTION OF THE PREFERRED EMBODIMENTS

A distance measuring system which measures a distance between two points will be described below as a preferred embodiment of the invention with reference to the accompanying drawings.

Figure 1:
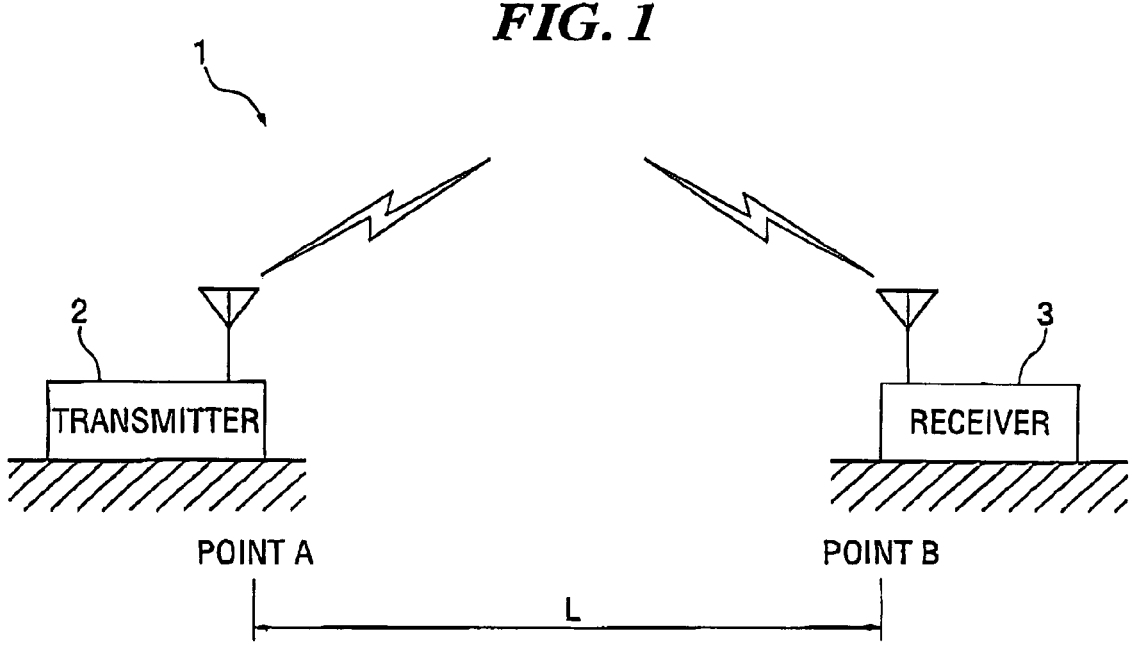
FIG. 1 is a structural diagram of a distance measuring system to which the invention is applied.

FIG. 1 shows the system structure of a distance measuring system 1 to which the invention is applied. The distance measuring system 1, which measures a distance L from a point A to a point B, has a transmitter 2 located at the point A and a receiver 3 located at the point B.

The transmitter 2 and the receiver 3 are radio communication apparatuses capable of respectively transmitting and receiving radio waves to and from each other using UWB (Ultra Wide Band) communication technology. The UWB communication technology transfers information without using a carrier wave by using a pulse signal with a very short period of one nanosecond or less and changing the position of the pulse signal on the time axis thereof. The use of the pulse signal with a very short period of one nanosecond or less considerably widens signal frequency band where the pulse signals for UWB communication occupies to several gigahertzs, but eliminates the need for the modulation using a carrier wave itself. This makes it possible to reduce the spectral power density. As the spectral power density can be reduced to or below the level of a noise signal, therefore, the radio communication apparatus will not be affected by another communication system or various apparatuses, thus achieving a high data transfer characteristic.

Unlike the carrier-using communication system that transmits a radio wave, the UWB communication system can accomplish communications by merely sending an extremely short pulse. This can greatly reduce dissipation power, and can achieve very fast communications by shortening the transmission period of the pulse signals.

In actually measuring the distance L with the distance measuring system 1, a time Tc for a UWB-based pulse signal transmitted from the transmitter 2 to be received by the receiver 3 is measured. The distance L is calculated by multiplying the measured propagation time Tc by a propagation speed Vc of the radio wave. The transmitter 2 measures the propagation time Tc from the transmission of the pulse signal to the reception of the retransmitted pulse signal, and multiplies the measured propagation time Tc by the propagation speed Vc of the radio wave to calculate the distance L.

Figure 2:
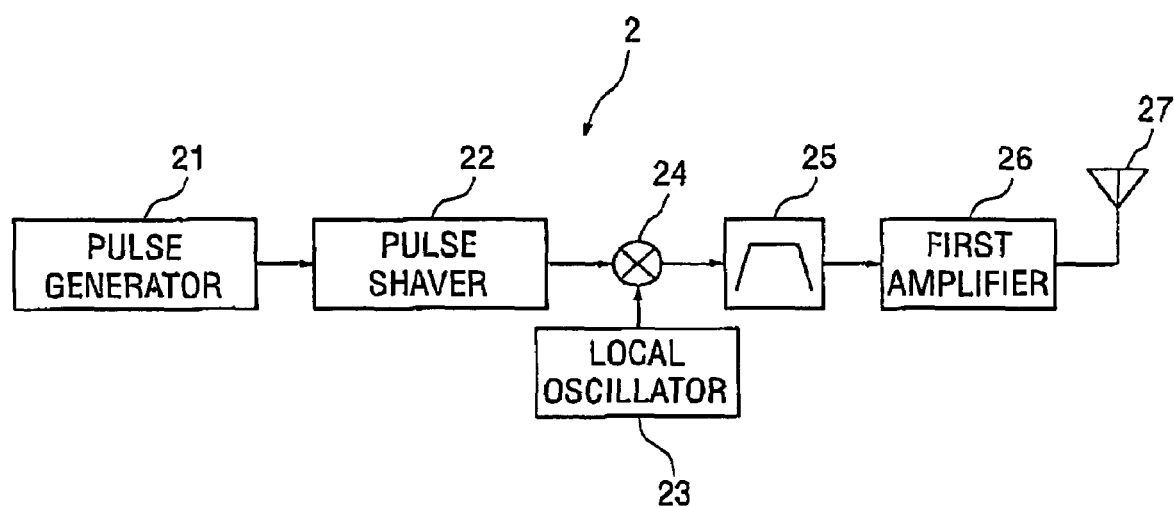
FIG. 2 is a block structural diagram of a transmitter constituting the distance measuring system to which the invention is applied.

FIG. 2 shows the block structure of the transmitter 2 that generates pulse signals needed for such UWB communications.

The transmitter 2 has a pulse generator 21, a pulse shaver 22 connected to the pulse generator 21, a mixer circuit 24, a local oscillator 23, a filter 25, a first amplifier 26 connected to the filter 25, and an antenna 27 connected to the first amplifier 26. The pulse generator 21 generates UWB pulse signals. The pulse shaver 22 receives a pulse signal generated by the pulse generator 21. The mixer circuit 24 performs frequency conversion on the pulse signal from the pulse shaver 22 based on a reference signal to be discussed later. The local oscillator 23 supplies the generated reference signal to the mixer circuit 24. The filter 25 limits the passband of the signal frequency-converted by the mixer circuit 24.

The pulse generator 21 generates a UWB pulse signal of a short time width over a wide band of several gigahertzs. In actual generation of the pulse signal, the pulse generator 21 sequentially generates a pulse sequence having pulse signals of equal amplitudes arranged at equi-time intervals. The pulse sequence generated by the pulse generator 21 is directly sent to the pulse shaver 22.

The pulse shaver 22 performs a predetermined shaving process on the individual pulse signals in the spread pulse sequence sent from the pulse generator 21.

The local oscillator 23 generates a reference signal for modulation. The local oscillation frequency of the reference signal to be generated by the local oscillator 23 may be so designed as to be variable in the local oscillator 23. The local oscillator 23 may be controllable in such a way that the local oscillation frequency to be generated is enhanced and attenuated by a PLL circuit (not shown) or the like.

The mixer circuit 24 performs frequency conversion on each of the pulse signals in the pulse sequence undergone the shaving process in the pulse shaver 22, based on the reference signal sent from the local oscillator 23. The mixer circuit 24 sends the pulse sequence consisting of the frequency-converted pulse signals to the filter 25.

The filter 25 passes only a desired band of the UWB pulse sequence output from the mixer circuit 24, and cuts off an unnecessary band. The passband of the filter 25 may be set in such a way as to be able to remove the unnecessary frequency component generated in the frequency conversion performed by the mixer circuit 24. The pulse sequence consisting of the band components passed by the filter 25 is directly output to the first amplifier 26.

The first amplifier 26 amplifies the pulse sequence from the filter 25, and compensates the pulse sequence in such a way that the frequency characteristic becomes flat within the band.

The antenna 27 converts the pulse sequence consisting of pulse signals as electric signals amplified by the first amplifier 26 to a pulse sequence as an electromagnetic radio wave, and transmits the pulse sequence in the air. The transmitter 2 may be equipped with a function of counting the time at which the pulse sequence as a radio wave is transmitted from the antenna 27.

Figure 3:
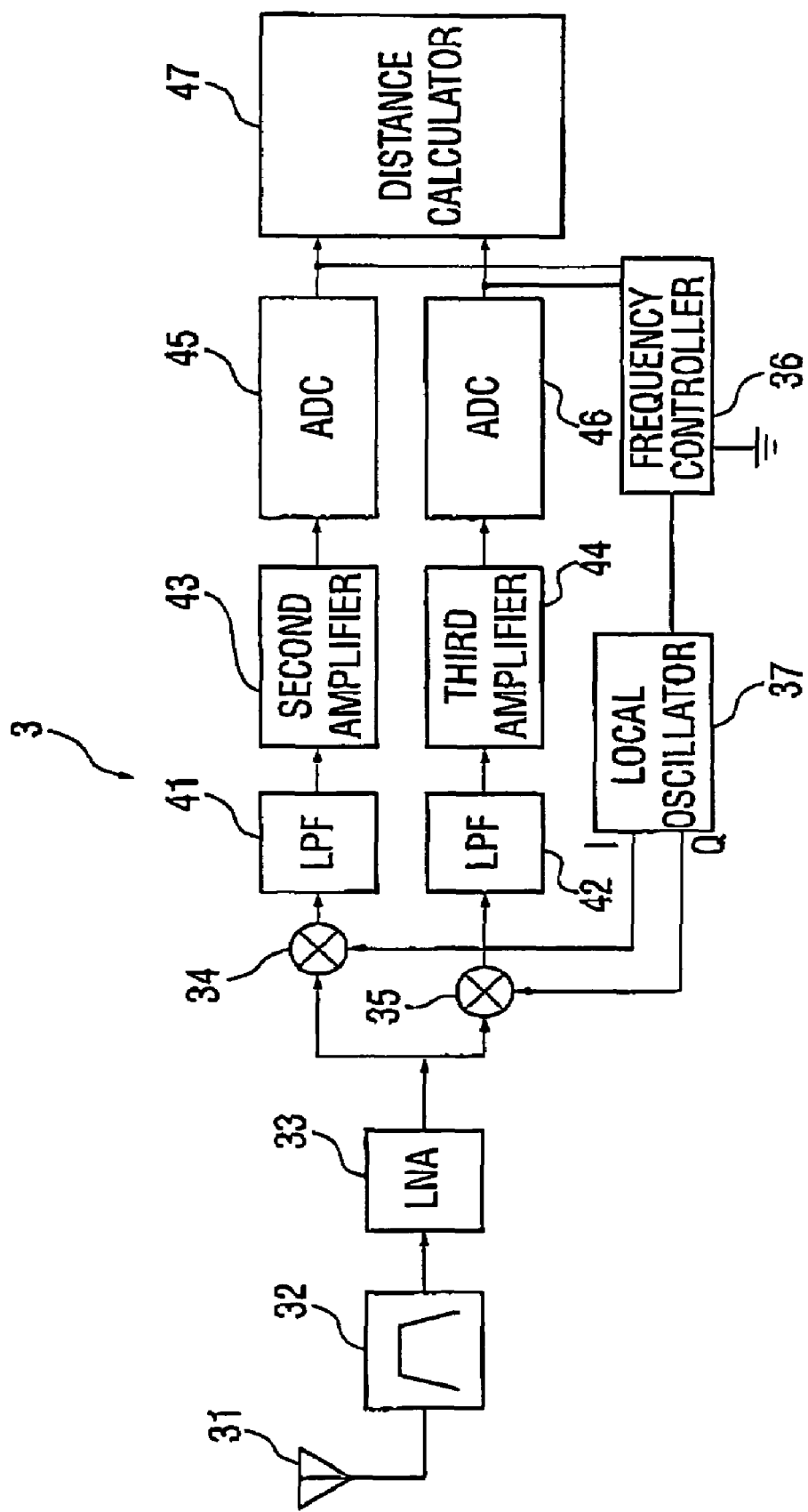
FIG. 3 is a block structural diagram of a receiver constituting the distance measuring system to which the invention is applied.

FIG. 3 shows the block structure of the receiver 3 which receives such UWB pulse signals.

The receiver 3 has an antenna 31, a filter 32 connected to the antenna 31, a low noise amplifier (LNA) 33, mixer circuits 34 and 35 connected to the LNA 33, a local oscillator 37, and a frequency controller 36. The antenna 31 receives UWB pulse signals from the transmitter 2. The LNA 33 performs high-frequency signal processing on a pulse sequence output from the filter 32. The local oscillator 37 supplies a generated reference signal to the mixer circuits 34 and 35. The frequency controller 36 controls the frequency of the reference signal to be oscillated by the local oscillator 37. The receiver 3 further has a low-pass filter (LPF) 41, a second amplifier 43, and an analog-digital converter (ADC) 45 connected to the mixer circuit 34 in order, and has an LPF 42, a third amplifier 44, and an ADC 46 connected to the mixer circuit 35 in order. The ADC 45 and the ADC 46 are both connected to a distance calculator 47.

The antenna 31 receives a pulse sequence as a radio wave transmitted from the transmitter 2, and converts the pulse sequence to a pulse sequence consisting of electric pulse signals.

The filter 32 removes a signal off the UWB band from the pulse sequence received by the antenna 31. That is, because a signal off the UWB band may be superimposed during the transmission of the radio wave from the transmitter 2 to the receiver 3, the signal is accurately removed by the filter 32.

The LNA 33 performs low noise amplification on the pulse sequence received by the antenna 31 and sent via the filter 32. As the UWB pulse signal has a slight level equal to or lower than the level of a noise signal, the UWB pulse sequence, even if amplified by an ordinary amplifier, cannot be distinguished from noise. In this respect, the LNA 33 is provided to selectively amplify only a desired UWB pulse signal, thereby yielding a noise-removed pulse sequence. The pulse sequence undergone low noise amplification by the LNA 33 is supplied to the mixer circuits 34 and 35 connected thereto.

The local oscillator 37 generates a in-phase signal (I signal) and an orthogonal signal (Q signal) as reference signals of the baseband under the control of the frequency controller 36. The local oscillator 37 sends the generated I signal to the mixer circuit 34, and sends the generated Q signal to the mixer circuit 35.

The mixer circuits 34 and 35 perform orthogonal modulation on the pulse signals in the pulse sequence sent from the LNA 33, based on the I signal and Q signal output from the local oscillator 37.

The LPF 41 and the LPF 42 remove high-frequency components in the UWB pulse sequences modulated by the mixer circuits 34 and 35, respectively, and pass only low-frequency components.

The second amplifier 43 amplifies the pulse sequence band-limited by the LPF 41, and sends the amplified pulse sequence to the ADC 45. The third amplifier 44 amplifies the pulse sequence band-limited by the LPF 42, and sends the amplified pulse sequence to the ADC 46.

The ADC 45 samples the analog baseband pulse signals sent from the second amplifier 43 to digitize the signals, and sends the digital pulse sequence to the distance calculator 47. The ADC 46 samples the analog baseband pulse signals sent from the third amplifier 44 to digitize the signals, and sends the digital pulse sequence to the distance calculator 47.

The distance calculator 47 calculates the distance L based on the pulse signals in the pulse sequences respectively sent from the ADCs 45 and 46. A method for the distance calculation will be described in detail later.

The frequency controller 36 reads the pulse signals digitized by the ADCS 45 and 46, and performs feedback control on the reference signal to be generated by the local oscillator 37, based on the digital pulse signals.

A description will be given of the operation of the thus constituted distance measuring system 1 of actually measuring the distance L from the point A to the point B.

First, the pulse generator 21 in the transmitter 2 generates a pulse sequence consisting of UWB pulse signals over a wide range. The generated pulse sequence is subjected to a shaving process in the pulse shaver 22. The pulse sequence is modulated with a high-frequency component of the local oscillation frequency by the mixer circuit 24, and the unnecessary frequency component is removed by the filter 25.

The pulse sequence converted to an electromagnetic radio wave by the antenna 27 via the first amplifier 26, and the radio wave is transmitted in the air. The radio wave transmitted in the air is received by the antenna 31 of the receiver 3 shown in FIG. 3, and is converted back to an electric pulse sequence. The pulse sequence is subjected to low noise amplification by the LNA 33 to be distinguishable from noise, and is then supplied to the mixer circuits 34 and 35.

The pulse sequences sent to the mixer circuits 34 and 35 are subjected to orthogonal modulation based on the I signal and the Q signal, and then pass through the LPFs 41 and 42 to remove high-frequency components superimposed on the pulse sequences. Finally, the pulse sequences are subjected to analog-digital conversion by the ADCs 45 and 46 before being sent to the-distance calculator 47.

Figure 4:
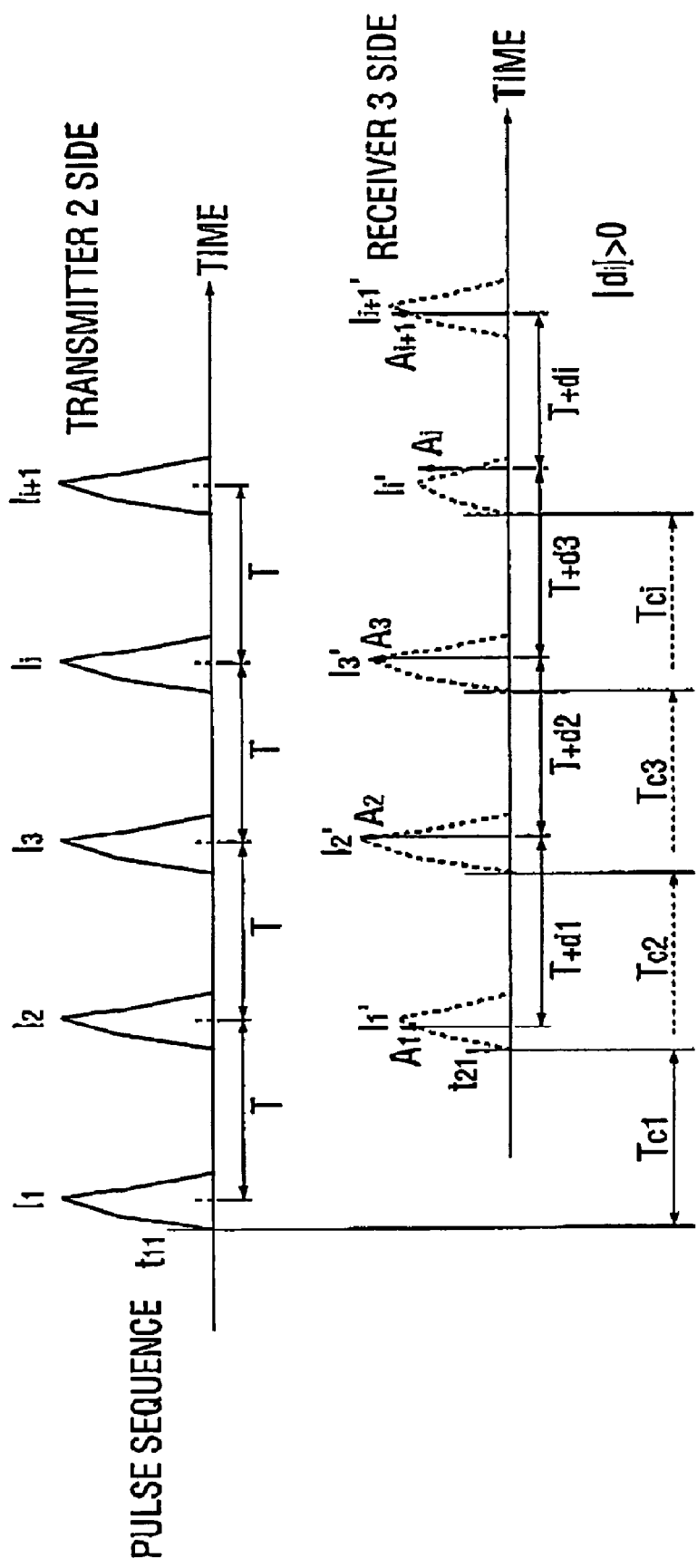
FIG. 4 is a diagram of an example of a pulse sequence to be transmitted and received.

The distance calculator 47 analyzes the pulse sequences sent from the ADCs 45 and 46. FIG. 4 shows a pulse sequence generated by the transmitter 2, and a pulse sequence generated by the receiver 3 in a time sequential manner. A pulse signal $I_1$ generated by time $t_{11}$ in the transmitter 2 is received by the receiver 3 as a pulse signal $I_1'$ at time $t_{21}$, and a time lag from time $t_{11}$ to time $t_{21}$ is equivalent to a propagation time Tc1. In the distance measuring system 1, not only the propagation time of a single pulse signal, but also the propagation times $Tc_1, Tc_2, Tc_3, \ldots, Tc_i, Tc_{i+1}$ of the pulse signals $I_1', I_2', I_3', I_i', I_{i+1}', \ldots$ received by the receiver 3 can be acquired respectively with respect to the pulse signals $I_1, I_2, I_3, I_i, I_{i+1}, \ldots$, which constitute the pulse sequence.

The propagation times $Tc_1, Tc_2, Tc_3, \ldots, Tc_i, Tc_{i+1}$ respectively represent time differences from the transmitter 2 to the receiver 3 for the same pulse signal. Paying attention to any one of the pulse signals in the pulse sequence, therefore, the distance L can be calculated if the propagation time of that pulse signal is acquired.

In consideration of the fact that the level of the amplitude of each pulse signal in a pulse has not been used yet as information, the distance measuring system 1 to which the invention is applied may acquire a propagation time based on a first calculation method to be discussed below from the viewpoint of making a measurement error in the distance L to be calculated smaller. In the first calculation method, the propagation time is acquired by giving different weightings to the pulse signals in the pulse sequence.

Figure 5:
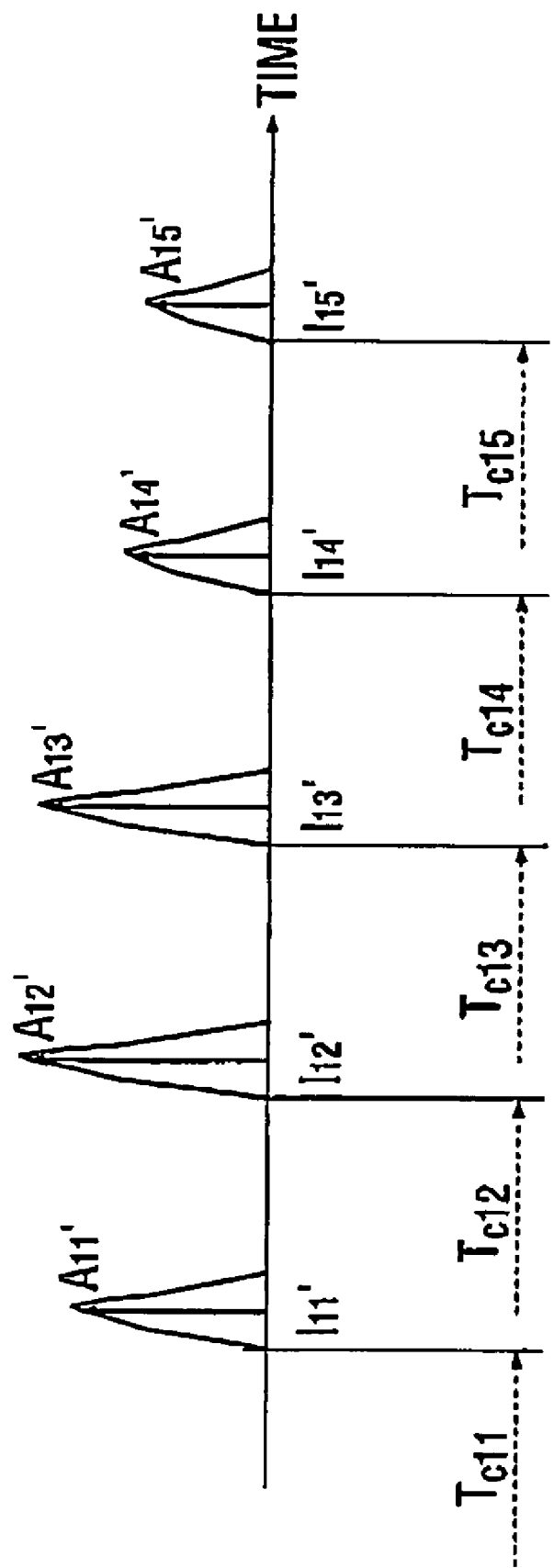
FIG. 5 is a diagram for explaining a first calculation method for the distance measuring system to which the invention is applied.

FIG. 5 shows one example of a pulse sequence read by the distance calculator 47. The amplitudes of the pulse signals in the pulse sequence, even if so controlled as to be identical, change between the pulse signals as shown in FIG. 5 in the transmission from the transmitter 2 to the receiver 3. The greater the amplitudes of the pulse signals in the pulse sequence, the higher the precision of the propagation times to be acquired.

Using the phenomenon, the distance calculator 47 acquires the distance L while taking into account the propagation time of a pulse signal with a larger amplitude among the pulse signals in the pulse sequence. In this case, the distance calculator 47 selects a plurality of pulse signals whose propagation times are to be actually acquired from the pulse signals in the pulse sequence. The pulse signals to be selected may include all the pulse signals in the pulse sequence, but may be any number of pulse signals equal to or greater than two.

Then, the distance calculator 47 identifies the amplitudes of the selected pulse signals. When pulse signals $I_{11}', I_{12}', I_{13}', I_{14}', I_{15}'$ are selected, for example, their amplitudes $A_{11}', A_{12}', A_{13}', A_{14}', A_{15}'$ differ from one another, but it is possible to identify $I_{12}'$ and $I_{13}'$ to be pulse signals with large amplitudes $A_{12}', A_{13}$, and $I_{14}'$ and $I_{15}'$ to be pulse signals with small amplitudes $A_{14}', A_{15}'$.

Next, the distance calculator 47 acquires propagation times $Tc_{11}, Tc_{12}, Tc_{13}, Tc_{14}, Tc_{15}$ of the pulse signals $I_{11}', I_{12}', I_{13}', I_{14}', I_{15}'$. Based on the acquired propagation times, the distance calculator 47 acquires the distance L. Weightings of data $Tc_{12}, Tc_{13}$ acquired for the large-amplitude pulse signals $I_{12}', I_{13}'$ are made larger, and weightings of data $Tc_{14}, Tc_{15}$ acquired for the small-amplitude pulse signals $I_{14}', I_{15}'$ are made smaller. That is, at the time of calculating the distance L from the transmitter by giving different weightings to the pulse signals for the propagation times acquired for the respective pulse signals, as the amplitudes of the pulse signals in the received pulse sequence become larger, the weightings are made larger.

Accordingly, the distance L to be acquired is calculated in such a way that the propagation time of a pulse signal with a larger amplitude is reflected greater on the distance L, and the propagation time of a pulse signal with a smaller amplitude is less reflected on the distance L, thereby reducing an error in measuring the distance. While weighting can be done based on the amplitude or power, weighting is done based on the amplitude in this example. As a result, an error of measuring a known distance L (=30 m) can be reduced to 59.6 cm.

The distance measuring system 1 to which the invention is applied may employ a second calculation method to be discussed below to select a single pulse signal which provides a propagation time to be acquired with the highest accuracy based on the amplitudes of the pulse signals in a pulse sequence, and calculate the distance L based on the selected pulse signal.

Figure 6:
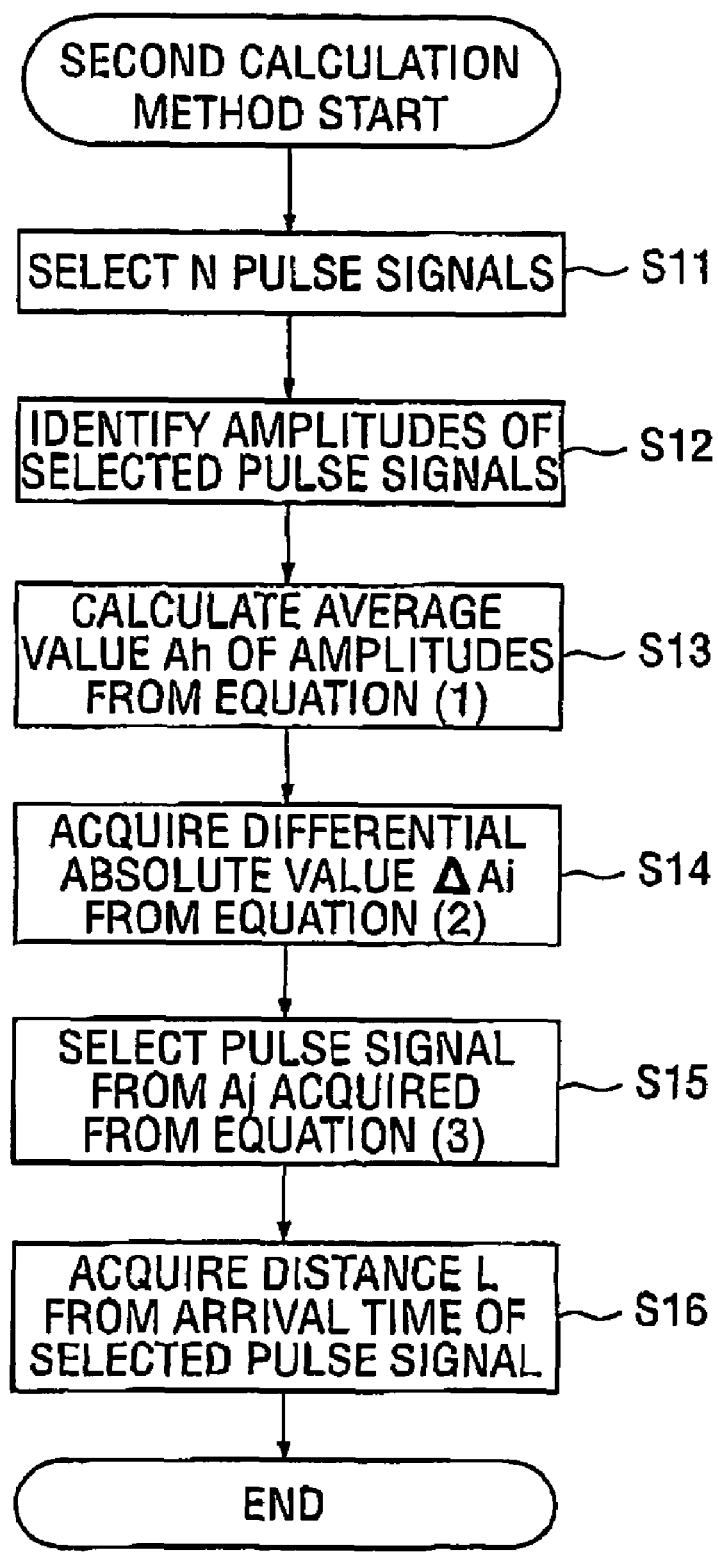
FIG. 6 is a diagram for explaining a second calculation method for the distance measuring system to which the invention is applied.

In this case, the distance calculator 47 first selects N pulse signals from the pulse signals in a pulse sequence at step S11 shown in FIG. 6.

Next, the flow proceeds to step S12 where the distance calculator 47 identifies the amplitudes of the selected N pulse signals.

Next, the flow proceeds to step S13 where the distance calculator 47 acquires an average value Ah of the amplitudes of the N pulse signals from the following equation (1).

$$Ah = \frac{\sum_{i=1}^{N} A_i}{N} \quad (1)$$

Next, the flow proceeds to step S14 where the distance calculator 47 acquires an absolute value $\Delta A_i$ of the difference between the amplitude of each pulse signal and the average amplitude value Ah acquired from the equation (1) from the following equation (2).

$$\Delta A_i = |A_i - Ah| \quad (2)$$

The flow then proceeds to step S15 where the distance calculator 47 selects a single pulse signal which minimizes the differential absolute value $\Delta A_i$ from the following equation (3). Specifically, the pulse signal that has an amplitude $A_j$ closest to the acquired average amplitude value is specified based on the equation (3).

$$A_i = \min\{\Delta A_i\} \quad (3)$$

The propagation time of the pulse signal selected this way is acquired, and the distance L from the point A to the point B is acquired based on the acquired propagation time (step S16). Consequently, the second calculation method can reduce an error of measuring a known distance L (=30 m) to 41.0 cm.

The distance measuring system 1 to which the invention is applied may acquire the distance L according to a third calculation method to be discussed below as an alternative to the second calculation method of acquiring the distance L based on information on the amplitudes of the pulse signals.

In the case, the distance calculator 47 selects N pulse signals whose propagation times are to be actually acquired from the pulse signals in the pulse sequence received from the transmitter 2. The N pulse signals to be selected are N consecutive pulse signals in the pulse sequence.

Next, the distance calculator 47 acquires an average time difference $\Delta T$ for N pulse signals selected from the following equation (4). $\Delta T$ is calculated by acquiring the sum of the differential absolute values of reception times of two adjacent pulse signals with the selected N pulse signals arranged on the time axis, and dividing the sum by the pulse signal number N minus 1. That is, $\Delta T$ is equivalent to the average of the differential absolute values of reception times of two adjacent pulse signals. As $\Delta T$ is acquired from the equation (4), the average of the time difference of reception times of adjacent pulse signals in the received pulse sequence can be acquired.

$$\Delta T = \frac{\sum_{i=1}^{N-1} |t_{i+1} - t_i|}{N - 1} \quad (4)$$

Next, using the acquired average time difference $\Delta T$, a reception time $t_j$ of a pulse signal in the pulse sequence is estimated. Given that the time difference between the pulse signal $I_j'$ whose reception time is to be estimated and a next pulse signal $I_{j+1}'$ is defined by $$\Delta T_j^1 = t_j - t_{j-1}; j=1, 2, \ldots, N-1 \quad (5)$$

a first estimated reception time can be acquired from the equation (6).

$$t_j^1 = t_{j-1} - T; j=1, 2, \ldots, N-1 \quad (6)$$

Figure 7A:
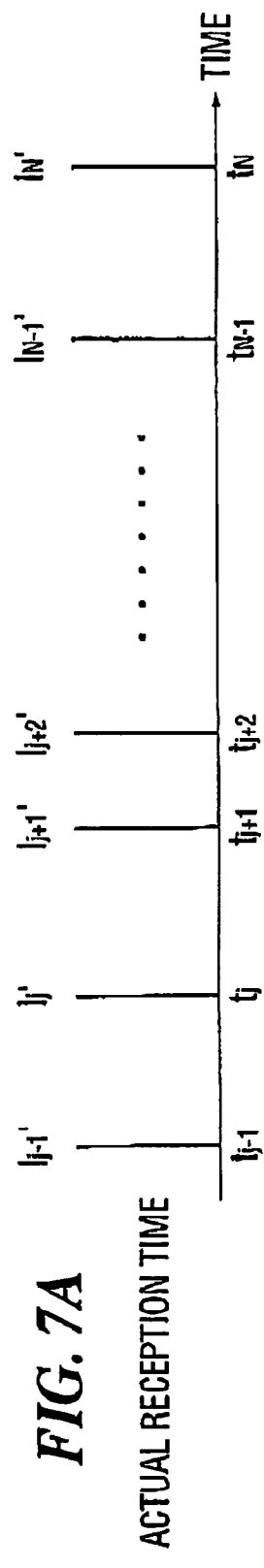
FIG. 7 is a diagram for explaining a third calculation method for the distance measuring system to which the invention is applied.
Figure 7B:
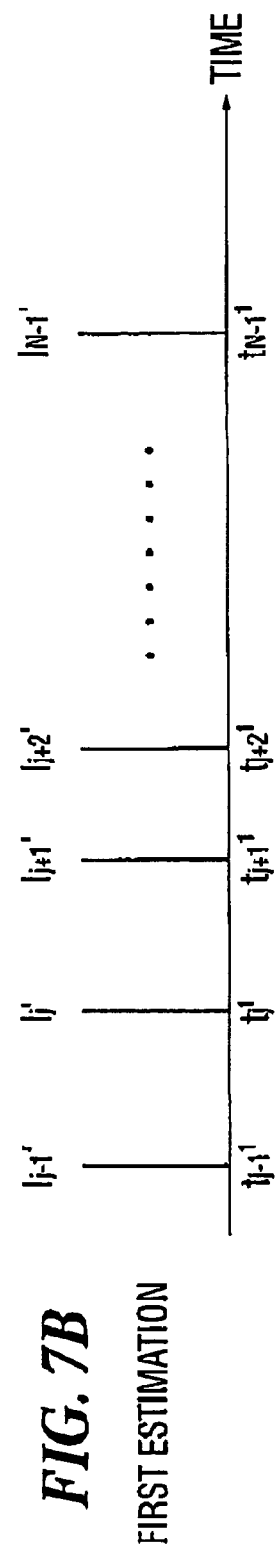
Figure 7C:
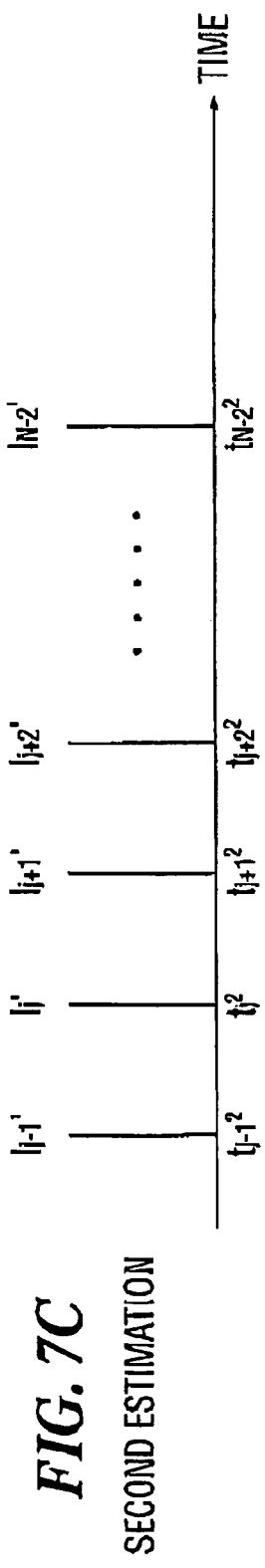

In the equation (6), the superscript indicates the analysis number. Upon completion of the first estimation, the estimated reception times $t_1^1, t_2^1, \ldots, t_{N-1}^1$ for the pulse signals $I_1', I_2', \ldots, I_{N-1}^1$ in the pulse sequence have been calculated. It is understood from FIG. 7 that the estimated reception times $t_1^1, t_2^1, \ldots, t_{N-1}^1$ are set with a more uniform time difference as compared with the actual reception times $t_1, t_2, \ldots, t_{N-1}$. It is to be noted that $t_N$ is eliminated for it is not updated in the manipulation.

Next, the distance calculator 47 performs second time estimation where the average of the sum of the differential absolute values of the reception times $t_1^1, t_2^1, \ldots, t_{N-1}^1$ estimated in the first time estimation is calculated.

$$\Delta T^1 = \frac{\sum_{i=1}^{N-2} |t_{i+1}^1 - t_i^1|}{N - 2} \quad (7)$$

Using the acquired average time difference $\Delta T^1$, the second time estimation is executed. Given that the time difference between the pulse signals is defined by $$\Delta T_j^2 = t_j^1 - t_{j+1}^1; j=1, 2, \ldots, N-2 \quad (8)$$

and a second estimated reception time $t_j^2$ can be acquired from the equation (9).

$$t_j^2 = t_j^1 - (\Delta T_j^2 - \Delta T^1); j=1, 2, \ldots, N-2 \quad (9)$$

It is understood that the second estimated reception times $t_1^2, t_2^2, \ldots, t_{N-2}^2$ are set with a more uniform time difference as compared with the actual reception times $t_1^1, t_2^1, \ldots, t_{N-1}^1$ calculated first.

As apparent from the above, every time the number of time estimations is increased by one, the number of pulses to be used is decreased by one. This is because the last pulse whose update is not carried out is intentionally removed from the processing.

In general, the time difference of the pulse signals in a pulse sequence varies in the transmission from the transmitter 2 to the receiver 3. The use of the third calculation method can ensure more uniform time differences, so that the average value of the estimated times of all the N–k pulses (assuming that time estimation has been done k times) or the estimated time of the pulse with the largest amplitude among all the N–k pulses can be taken as the actual propagation time at the time of acquiring the actual propagation time.

In the third calculation method, calculation of the estimated reception time may be executed three times or more using the equations. An increase in the number of calculations of the estimated reception time improves the accuracy of the estimation of the estimated reception time, making it possible to significantly improve the accuracy of the calculation of the distance L itself.

In the third calculation method, the distance L may be calculated based only on the result of the first time estimation. In the third calculation method, the second time estimation and time estimation thereafter may be carried out without using the equation (7) but by using the equations (4) to (6). This alternative method can also improve the accuracy of calculation of the distance L itself significantly.

The distance measuring system 1 to which the invention is applied may acquire the distance L according to a fourth calculation method to be discussed below.

In this case, the distance calculator 47 selects N pulse signals whose propagation times are to be actually acquired from the pulse signals in the pulse sequence received from the transmitter 2. The N pulse signals to be selected may be N consecutive pulse signals selected from the pulse signals in the pulse sequence, but may not be limited thereto and random N pulse signals may be extracted.

Next, the distance calculator 47 acquires the propagation times of the selected N pulse signals. Then, the acquired propagation times of the pulse signals are sorted in the order of a longer-to-shorter time length, and the distance L is calculated based on the center value. This can improve the accuracy of calculation of the distance L.

As mentioned above, the distance calculator 47 in the distance measuring system 1 to which the invention is applied can acquire the distance L to be calculated with a high accuracy even with efficient use of information on the amplitudes of the pulse signals in the received pulse sequence or information on the reception times, thus making a measuring error smaller.

Although the foregoing description of the embodiment has been given of a case where the first calculation method, the second calculation method or the third calculation method is executed alone, the invention is not restrictive to the case, and the second calculation method and the third calculation method may be executed in combination, or the first calculation method and the third calculation method may be executed in combination. Furthermore, according to the invention, the first calculation method, the second calculation method and the third calculation method may be executed in combination.

Although the foregoing description of the embodiment has been given of a case where the distance L is calculated based on the propagation times of UWB pulse signals, the invention is not limited to the UWB type, but is also applicable to all the distance measuring methods that use pulse signals.

Although the foregoing description of the embodiment has been given of a case where the distance L is calculated by measuring the propagation time Tc of the pulse signal transmitted from the transmitter 2 to be received by the receiver 3, the invention is not limited to this case. For example, a transmitter/receiver 6 may be located at the point A and a communication apparatus 7 may be located at the point B, so that the transmitter/receiver 6 sends UWB pulse signals to the communication apparatus 7, which sends the received pulse signals again to the transmitter/receiver 6.

Figure 8:
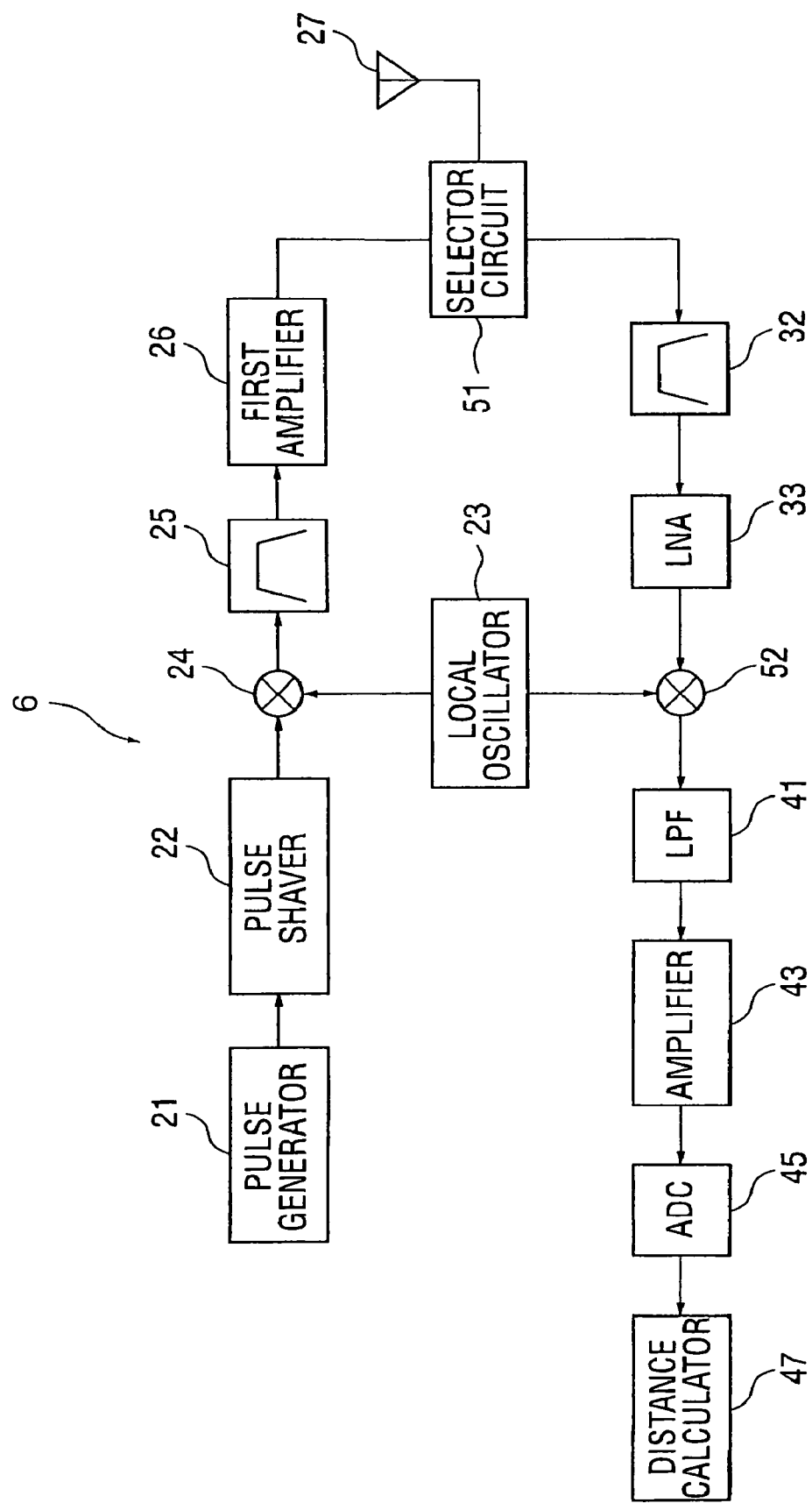
FIG. 8 is a diagram of an example of another structure of the distance measuring system to which the invention is applied.
Figure 9:
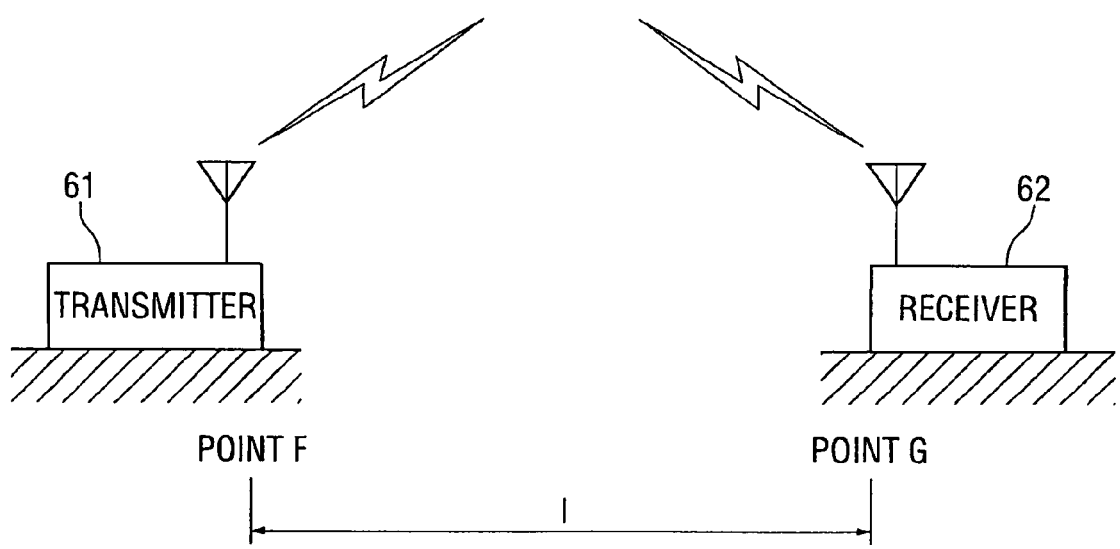
FIG. 9 is a diagram for explaining a conventional distance measuring system.
Figure 10:
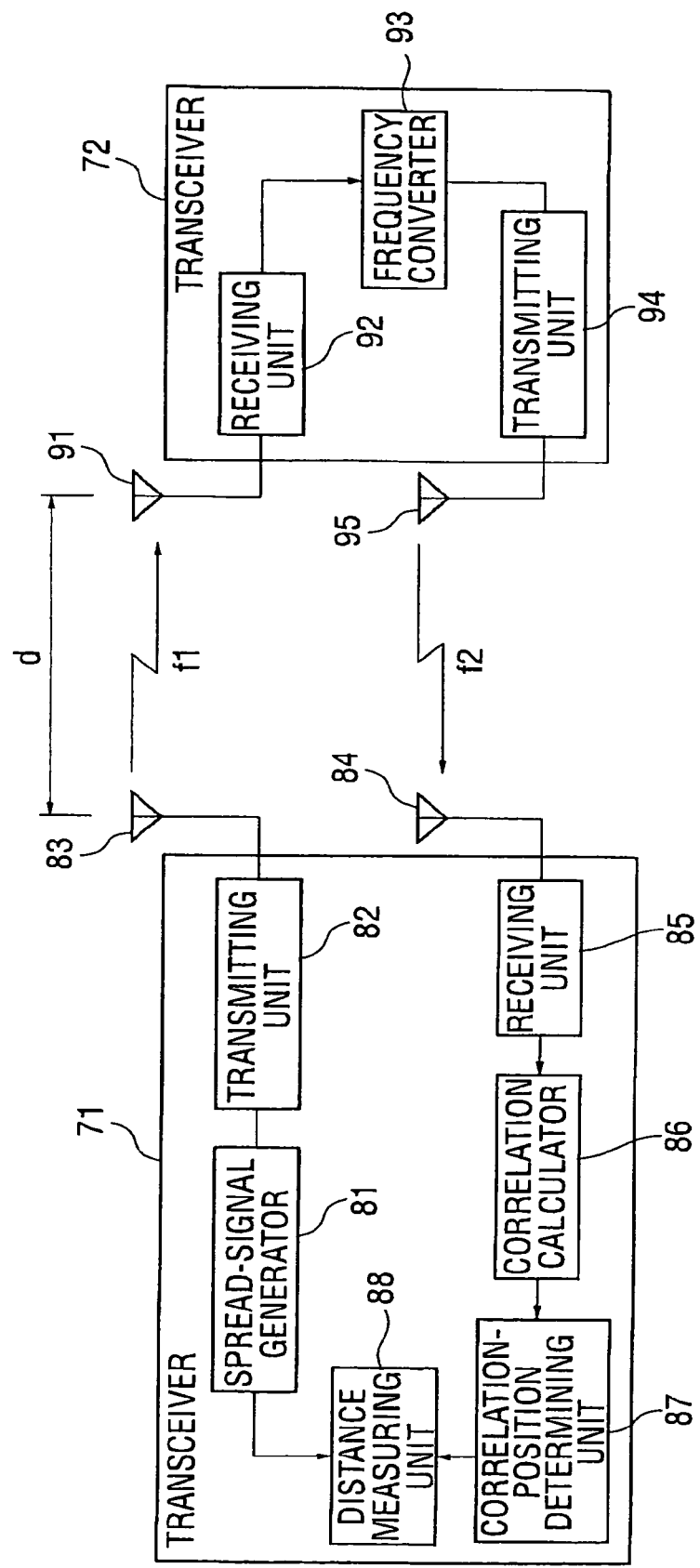
FIG. 10 is a block structural diagram of another conventional distance measuring system.
Figure 11:
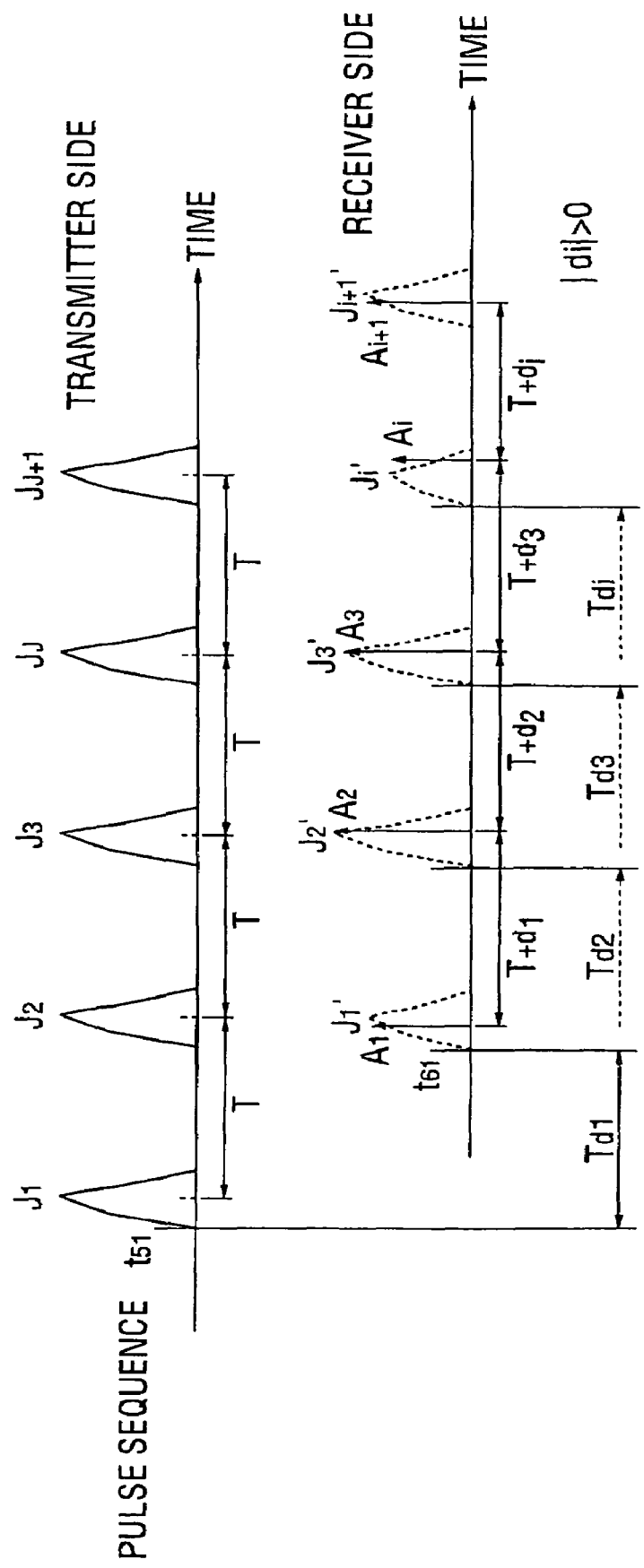
FIG. 11 is a diagram for explaining a conventional distance measuring method.

FIG. 8 shows the block structure of the transmitter/receiver 6. To avoid a redundant description, same reference numerals are given to the components and members of the transmitter/receiver 6 which are the same as the transmitter 2 and the receiver 3.

The transmitter/receiver 6 includes a pulse generator 21, a pulse shaver 22 connected to the pulse generator 21, a mixer circuit 24, a local oscillator 23, a filter 25, a first amplifier 26 connected to the filter 25, a selector circuit 51 connected to the first amplifier 26, and an antenna 27 connected to the selector circuit 51. The pulse generator 21 generates pulse signals. The pulse shaver 22 receives a pulse signal generated by the pulse generator 21. The mixer circuit 24 performs frequency conversion on the pulse signal from the pulse shaver 22 based on a reference signal. The local oscillator 23 generates a reference signal. The filter 25 limits the passband of the signal frequency-converted by the mixer circuit 24. The transmitter/receiver 6 further includes a filter 32 connected to the selector circuit 51, a low noise amplifier (LNA) 33, a mixer circuit 52 connected to the LNA 33 and the local oscillator 23, an LPF 41, an amplifier 43 and an ADC 45 connected to the mixer circuit 52 in the order mentioned, and a distance calculator 47 connected to the ADC 45. The LNA 33 performs high-frequency signal processing on a pulse sequence output from the filter 32.

To transmit a pulse sequence to the communication apparatus 7, the selector circuit 51 executes switching in such a way as to connect the first amplifier 26 to the antenna 27. To receive a pulse sequence from the communication apparatus 7, the selector circuit 51 executes switching in such a way as to connect the antenna 27 to the filter 32.

The structure of the communication apparatus 7 should merely have a capability of receiving at least the pulse sequence via an antenna, and transmitting the received pulse sequence to the transmitter/receiver 6 again via an antenna, and may take a block structure similar to that of the transmitter/receiver 6.

The transmitter/receiver 6 generates a pulse sequence in a manner similar to that discussed above, and transmits the pulse sequence to the communication apparatus 7, which transmits the pulse sequence again to the transmitter/receiver 6. The transmitter/receiver 6 receives the pulse sequence from the communication apparatus 7 via the antenna 27, and sends the pulse sequence to the filter 32 via the selector circuit 51, and finally to the distance calculator 47.

While the distance calculator 47 acquires a propagation time according to the first calculation method, the second calculation method or the third calculation method, the propagation time is just equivalent to a time for a pulse sequence to reciprocate between the transmitter/receiver 6 and the communication apparatus 7, so that actual calculation of the distance L should be carried out after the propagation time is divided by "2".

The distance measuring system 1 which transmits and receives such a pulse sequence can of course likewise enhance the accuracy of measuring the distance L.

What is claimed is:

1. A distance measuring system:
an Ultra Wide Band (UWB) transmitter including a UWB pulse sequence generator that sequentially generates UWB pulse sequences each having a plurality of UWB pulse signals of equal amplitudes arranged at equi-time intervals, and a transmitting unit that transmits the pulse sequence generated by the pulse sequence generator as a radio wave; and
a UWB receiver including a receiving unit that receives the pulse sequence transmitted from the transmitter as a radio wave, and a distance calculating unit that acquires propagation times of the pulse signals in the pulse sequence received by the receiving unit to reach the receiving unit from the transmitting unit, and calculates a distance from the transmitter based on a propagation time for a selected pulse signal to reach the receiving unit from the transmitting unit,
wherein the distance calculating unit selects said selected pulse signal by acquiring an average value of the amplitudes of the pulse signals in the pulse sequence received by the receiving unit, sequentially calculates an absolute value of the difference between the acquired average value of the amplitudes and the amplitudes of the pulse signals, specifies a pulse signal whose amplitude minimizes the calculated absolute value of differences, and calculates a distance from the transmitter based on a propagation time for the specified pulse signal to reach the receiving unit from the transmitting unit.

2. A distance measuring system comprising:
an Ultra Wide Band (UWB) transmitter including a UWB pulse sequence generator that sequentially generates UWB pulse sequences each having a plurality of UWB pulse signals of equal amplitudes arranged at equi-time intervals, and a transmitting unit that transmits the pulse sequence generated by the pulse sequence generator as a radio wave; and
a UWB receiver including a receiving unit that receives the pulse sequence transmitted from the transmitter as a radio wave, and a distance calculating unit that acquires propagation times of the pulse signals in the pulse sequence received by the receiving unit to reach the receiving unit from the transmitting unit, and calculates a distance from the transmitter by acquiring an average value of absolute values of time differences among the pulse signals in the pulse sequence received by the receiving unit, performing a first estimation to estimate a time of reception of a pulse signal based on the acquired average value and a time of reception of another adjoining pulse signal, and calculating a distance from the transmitter based on the time of reception of the pulse signal estimated in the first estimation and a propagation time for that pulse signal to reach the receiving unit from the transmitting unit.

3. The distance measuring system according to claim 2, wherein the distance calculating unit further acquires an average value of absolute values of time differences among the pulse signals based on the time of reception of the pulse signal estimated in the first estimation, performs a second estimation to estimate a time of reception of a pulse signal based on the acquired average value and an estimated time of reception of another adjoining pulse signal, and calculates a distance from the transmitter based on the time of reception of the pulse signal estimated in the second estimation and a propagation time for that pulse signal to reach the receiving unit from the transmitting unit.

4. The distance measuring system according to claim 2, wherein the distance calculating unit iteratively executes estimation of the time of reception of each pulse signal in said pulse sequence in order to acquire said average value of absolute values of time differences among the pulse signals in the pulse sequence.

* * * * *